(12) United States Patent
Kidachi et al.

(10) Patent No.: US 8,117,311 B2
(45) Date of Patent: Feb. 14, 2012

(54) COMMUNICATION METHOD, SERVER AND MEDIUM ON NOTIFICATION OF SESSION STATUS

(75) Inventors: Takaaki Kidachi, Kawasaki (JP); Tatuhiro Furuya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 177 days.

(21) Appl. No.: 12/708,867

(22) Filed: Feb. 19, 2010

(65) Prior Publication Data

US 2010/0153547 A1 Jun. 17, 2010

Related U.S. Application Data

(63) Continuation of application No. PCT/JP2007/067027, filed on Aug. 31, 2007.

(51) Int. Cl.
*G06F 15/173* (2006.01)
(52) U.S. Cl. ......... 709/226; 709/203; 709/227; 370/352
(58) Field of Classification Search .................. 709/203, 709/224, 226, 227; 370/331, 352
See application file for complete search history.

(56) References Cited

U.S. PATENT DOCUMENTS

| | | | |
|---|---|---|---|
| 7,751,842 B2* | 7/2010 | Sung et al. | 455/518 |
| 7,773,983 B2* | 8/2010 | Takeda | 455/420 |
| 7,852,838 B2* | 12/2010 | Miller et al. | 370/352 |
| 2003/0224820 A1 | 12/2003 | Einola et al. | |
| 2005/0155036 A1* | 7/2005 | Tiainen et al. | 719/310 |
| 2008/0212569 A1* | 9/2008 | Terrill et al. | 709/226 |
| 2008/0232352 A1* | 9/2008 | Terrill et al. | 370/352 |

FOREIGN PATENT DOCUMENTS

| | | |
|---|---|---|
| JP | 2004-507946 | 3/2004 |
| JP | 2005-293065 | 10/2005 |
| JP | 2006-135469 | 5/2006 |
| JP | 2006-311125 | 11/2006 |
| JP | 2007-41851 | 2/2007 |
| JP | 2007-201900 | 8/2007 |

OTHER PUBLICATIONS

International Preliminary Report on Patentability and Written Opinion of the International Searching Authority dated Mar. 9, 2010, from the corresponding International Application.
International Search Report dated Nov. 13, 2007, from the corresponding International Application.

* cited by examiner

*Primary Examiner* — Ramy M Osman
(74) *Attorney, Agent, or Firm* — Katten Muchin Rosenman LLP

(57) ABSTRACT

A first server receives the notification of connection ready from each of a plurality of second terminals for executing second communication, notifies the connection ready of each of the second terminals to a second server, detects connection by first communication between a plurality of first terminals, and notifies the detected connection by the first communication to the second server. The second server, upon recognizing the connection ready between the second terminals and the connection by the first communication between the first terminals, provides a service by the second communication between the second terminals.

11 Claims, 14 Drawing Sheets

FIG.5

| SERVICE SV1 | |
|---|---|
| USER | TERMINAL |
| U1 | 1A |
| U2 | 2A |
| : | : |
| SERVICE SV2 | |
| USER | TERMINAL |
| U1 | 1B |
| U2 | 2B |
| : | : |

FIG.6

| USER IDENTIFYING INFORMATION | IDENTIFYING INFORMATION OF TERMINAL USED IN VOICE SESSION | AS SERVICE SUBSCRIBED-OR-UNSUBSCRIBED STATUS, SUBSCRIBED, UNSUBSCRIBED |
|---|---|---|
| USER U1 | 1A | SUBSCRIBED |
| USER U2 | 2A | SUBSCRIBED |
| USER U3 | 3A | UNSUBSCRIBED |
| ⋮ | ⋮ | ⋮ |

COMMUNICATION METHOD, SERVER AND MEDIUM ON NOTIFICATION OF SESSION STATUS

CROSS-REFERENCE TO RELATED APPLICATION

This is a continuation of Application PCT/JP2007/067027, filed on Aug. 31, 2007, now pending, the contents of which are herein wholly incorporated by reference.

FIELD

The technology relates generally to a technology of managing a session status in a communication network, and more particularly to a technology by which one server managing the session status in a communication between terminals notifies another server of the session status, which provides a service based on the communication between these terminals or between terminals related to these former terminals.

BACKGROUND

In a communication network defined by IMS (IP Multimedia Subsystem), the session is initiated based on a protocol called SIP (Session Initiation Protocol), SDP (Session Description Protocol)-based session information is exchanged, and an RTP (Real Time Transport Protocol) packet is transmitted in a P2P (Peer To Peer) architecture. A progress of transition to NGN (Next Generation network) enables multifarious types of terminals to perform a plurality of communications in a SIP-based session. In this case, the communication network is equipped with a server called an AS (Application Server) which provides services on a variety of media.

In the communication network defined by the IMS, normally the SIP server called a CSCF (Call Session Control Function) manages the session status. In the communication network defined by the IMS in the present situation, there is not any specific proposal about a method by which the CSCF notifies the AS of the session status.

To be specific, important factors for realizing a service involving a session operation in an extension of an existing voice and sound service (e.g., VoIP (Voice over Internet Protocol)) are a "disclosure of existing session information" and a "session control authority transfer (session transfer)". Hereafter a voice communication service including a meaning of transferring of sound may be called simply as voice service. The voice service provides a kind of telephone function. In the present situation, the AS has no method of knowing the information on the existing session established by the CSCF. It is therefore difficult to provide the service involving the session operation in the extension of the existing voice service (see FIG. 1).

In FIG. 1, a user U1 of a mobile terminal 1A telephones a user U2 of a mobile terminal 2A via the CSCF. At this time, a voice session (parent session) is established between the mobile terminals 1A and 2A via the CSCF. In this case, there has hitherto been no function of newly providing a multimedia service related to the voice session.

For example, the session for transmitting and receiving a picture through an intermediary of the AS could not be established by way of an extension of the parent session between the user U1 and the user U2. Moreover, new image terminals 1B, 2B could not be added by way of an extension of the voice session between the user U1 and the user U2. Namely, the communication using the image terminals 1B and 2B could not be established by way of the extension of the parent session while the AS intervenes in establishing the communication. The reason why so is that there is no method by which the AS knows the existing session information managed by the CSCF. Thus, it was not feasible to add the new service involving the session operation via the AS with respect to the existing voice session.

Herein, the parent session connotes a session established via the CSCF between the user U1 and the user U2. Further, a second session, in which the AS intervenes, configured in relation to the parent session is referred to as a child session (of which a status is termed child presence). Moreover, the session represents a combination of a couple of terminals connected in the P2P architecture, a status of the connection between these terminals, or a flow of data transmitted and received via the connection between the terminals.

FIG. 2 illustrates a general method of providing the session information to the AS in a CSCF-based control method. For instance, a service for providing information on a telephone directory currently exists at a Web site on the Internet. This service is that the terminal of the user U1 accesses the telephone directory at the Web site, thus acquiring a call recipient (SIP-URI (Uniform Resource Identifier) etc) of the user U2 as a communication partner. Then, the terminal of the user U1 requests the Web site to originate a call to the terminal of the user U2. Thereupon, the server providing the Web site transmits an instruction to the CSCF via the AS, and the call origination from the terminal of the user U1 to the call recipient is conducted. Thus, the intermediary of the specific server as in the case of the server providing the Web site on the Internet facilitates the linkup between the AS and the CSCF.

The current CSCF procedure does not, however, enable the AS to be easily notified of the information on the parent session.

[Patent document 1] Japanese Unexamined Patent Publication No. 2004-507946

SUMMARY

It is an object of the present invention to provide a linkup technology by which a second server, providing a child session as an associative added service with respect to a parent session managed by a first server, obtains information on the parent session and thus can easily provide the service of the child session as the associative added service in communication services as defined by IMS.

One aspect of the embodiment is a communication method in a system including a first server managing first communications between a plurality of first terminals; and a second server providing a service based on second communications associated with the first communications between the plurality of first terminals or between a plurality of second terminals related respectively to the plurality of first terminals. In this communication method, the first server receives notification of completion of a preparation for a connection from each of the plurality of second terminals performing the second communications, notifies the second server of the completion of the preparation for the connection of each of the plurality of second terminals, detects the connection based on the first communications between the plurality of first terminals, and notifies the second server of the detected connection based on the first communications. Further, the second server provides a service based on the second communications between the plurality of second terminals upon recognizing the completion of the preparation of the connection in each of the plurality of second terminals and the connection based on the first communications between the first terminals.

Further, in another mode, at least one the plurality of first terminals may detect the connection based on the first communications with another of the plurality of first terminals and may notify the second server of the detected connection based on the first communications. On the other hand, the second server may provide a service based on the second communications between the plurality of second terminals upon recognizing the completion of the preparation for the connection in each of the plurality of second terminals related respectively to the one and the another of the plurality of first terminals and the connection based on the first communications between the one and the another of the plurality of first terminals.

In still another mode, the first server may receive notification of completion of a preparation for a connection from each of the plurality of second terminals performing the second communications, may detect the connection based on the first communications between the plurality of first terminals, and may instruct the second server to provide a service based on the second communications between the plurality of second terminals upon recognizing the completion of the preparation of the connection in each of the plurality of second terminals and the connection based on the first communications between the first terminals. Then, the second server may provide the service based on the second communications between the plurality of second terminals upon receiving the service providing instruction sent from the first server.

The object and advantage of the embodiment will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

FIG. 1 is a diagram illustrating a relationship between a voice session by CSCF and an image session by AS.

FIG. 5 is a diagram of a structure of a service subscription information table.

FIG. 6 is a diagram illustrating an example of a structure of an AS service subscribed-or-unsubscribed status determining table.

FIG. 8 is a flowchart illustrating a service management process in the AS.

DESCRIPTION OF EMBODIMENT(S)

A communication system according to an embodiment will hereinafter be described with reference to the drawings.

A communication method according to the embodiment will be discussed. An aspect of the communication system includes in an effective linkup method between a CSCF (Call Session Control Function) (corresponding to a first server) and an AS (Application Server) (corresponding to a second server).

(1) Method of Relaying Communications in CSCF to AS

Figure 1:
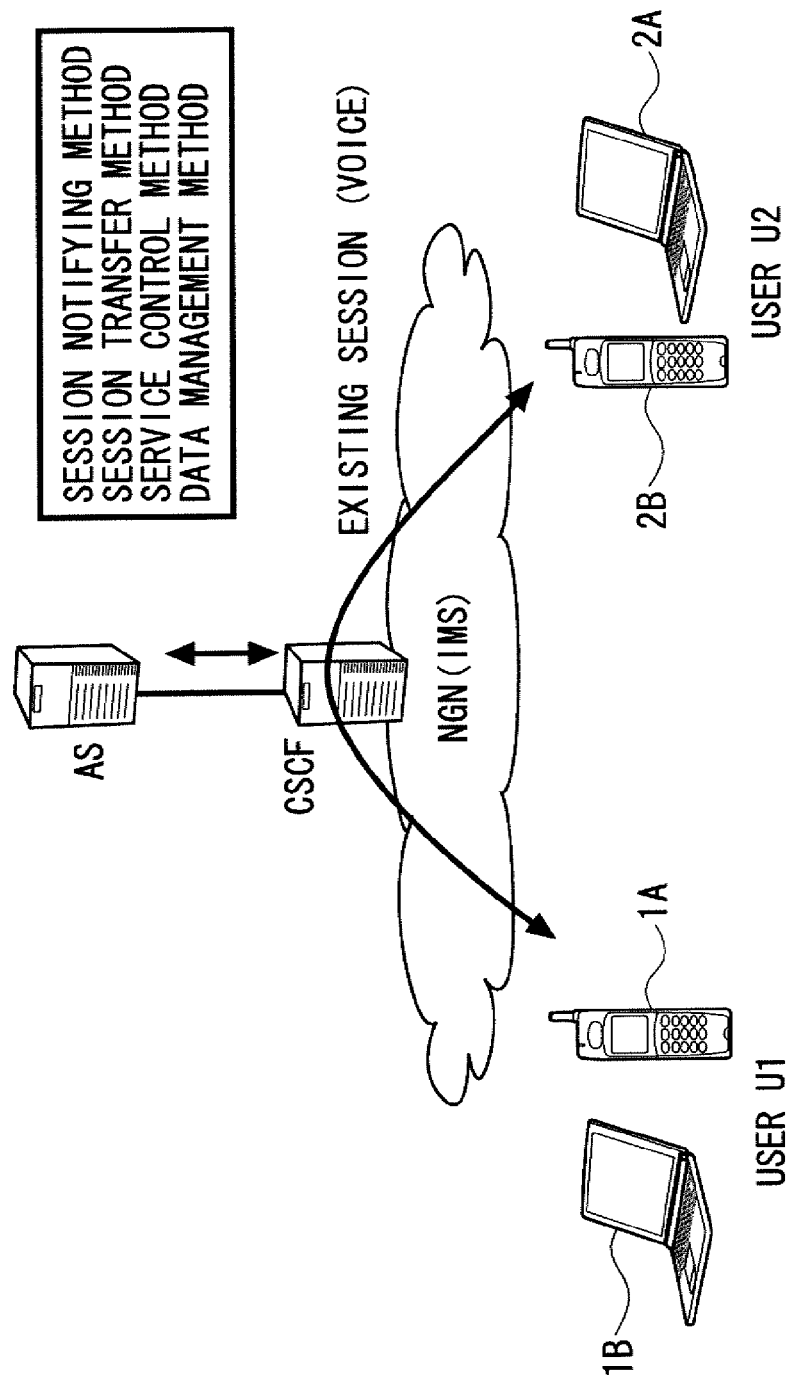
Figure 2:
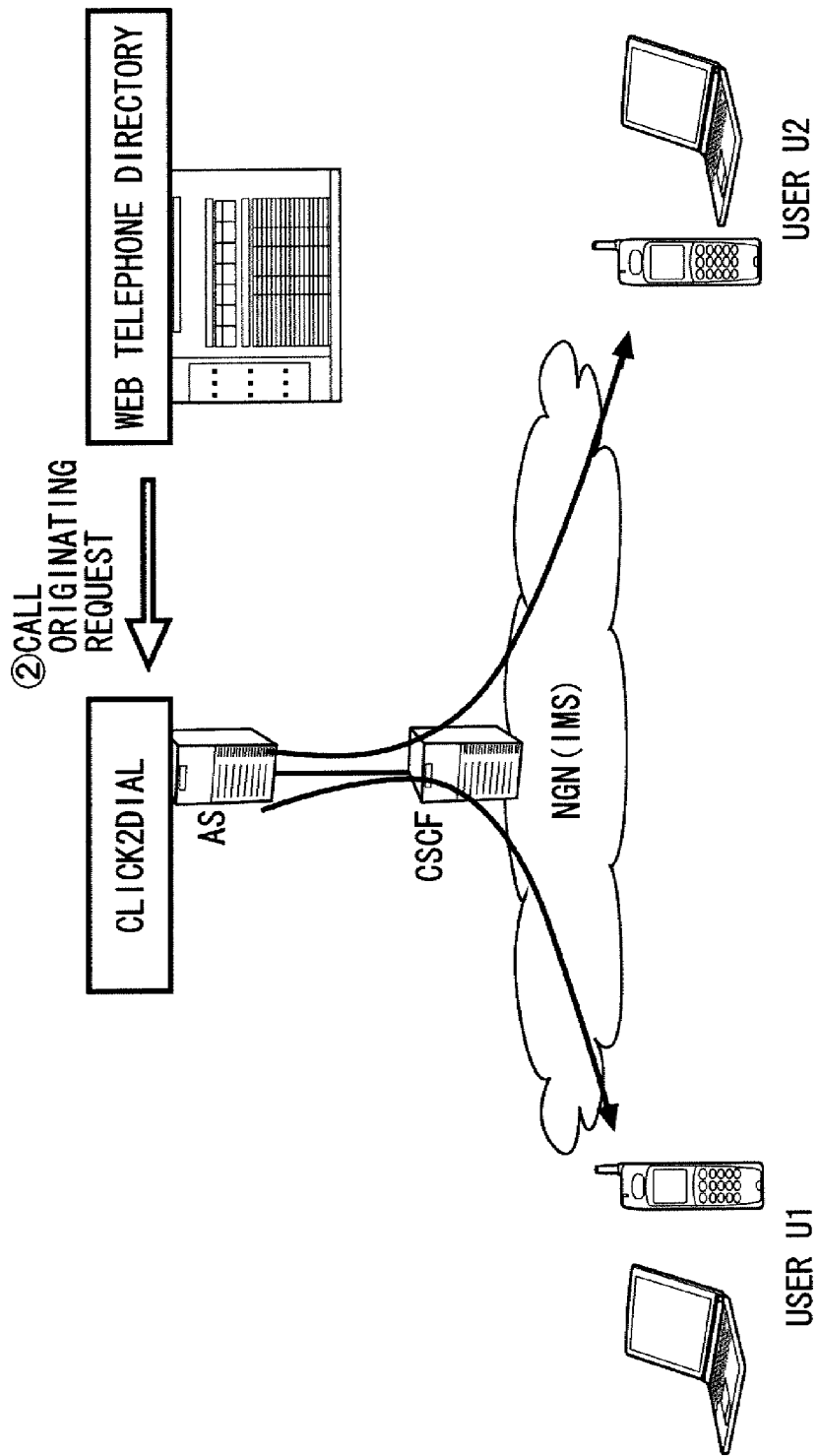
FIG. 2 is a diagram illustrating a general method of providing session information to the AS in a control method by the CSCF.
Figure 3:
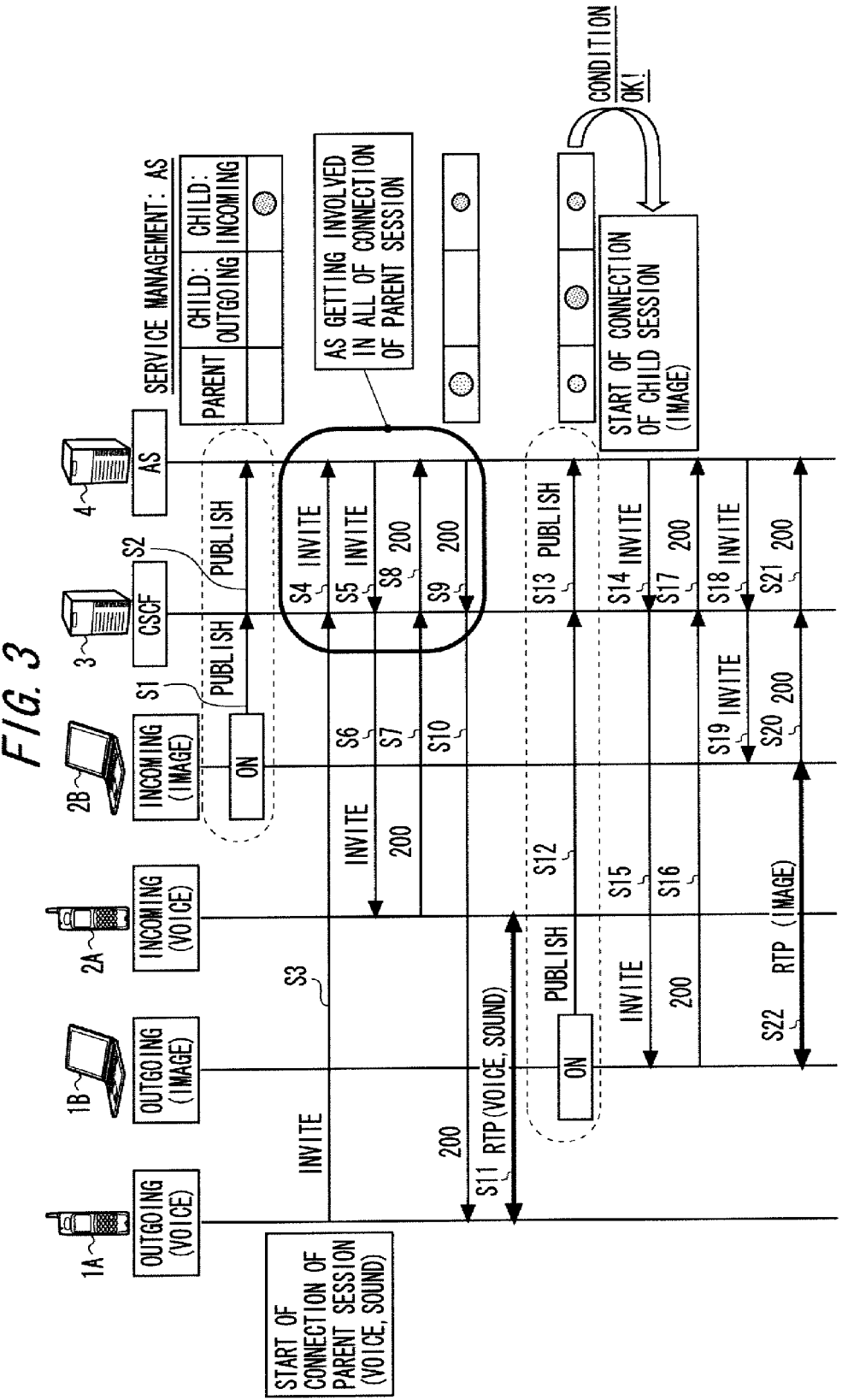
FIG. 3 is a sequence diagram of a communication system according to a first embodiment.

A first method is a method by which the CSCF is caused to work as a relay device and all messages addressed to the CSCF are transmitted to the AS from terminals performing SIP-based communications (see FIG. 3). This method is simple as the method of establishing the linkup between the CSCF and the AS. It, however, follows that a subscription call of an AS providing service in the IMS is transferred to the AS even if the AS providing service is not actually started up. Therefore, on the occasion of considering an application to a network where the CSCF has already provided the service, for example, if a call having dual subscriptions of the CSCF providing service and the AS providing service as well occurs, it is desirable to take both of influence on the existing CSCF providing service and an increase in traffic into consideration.

(2) Session Status Notifying Method (Startup of Service: AS)

Figure 9:
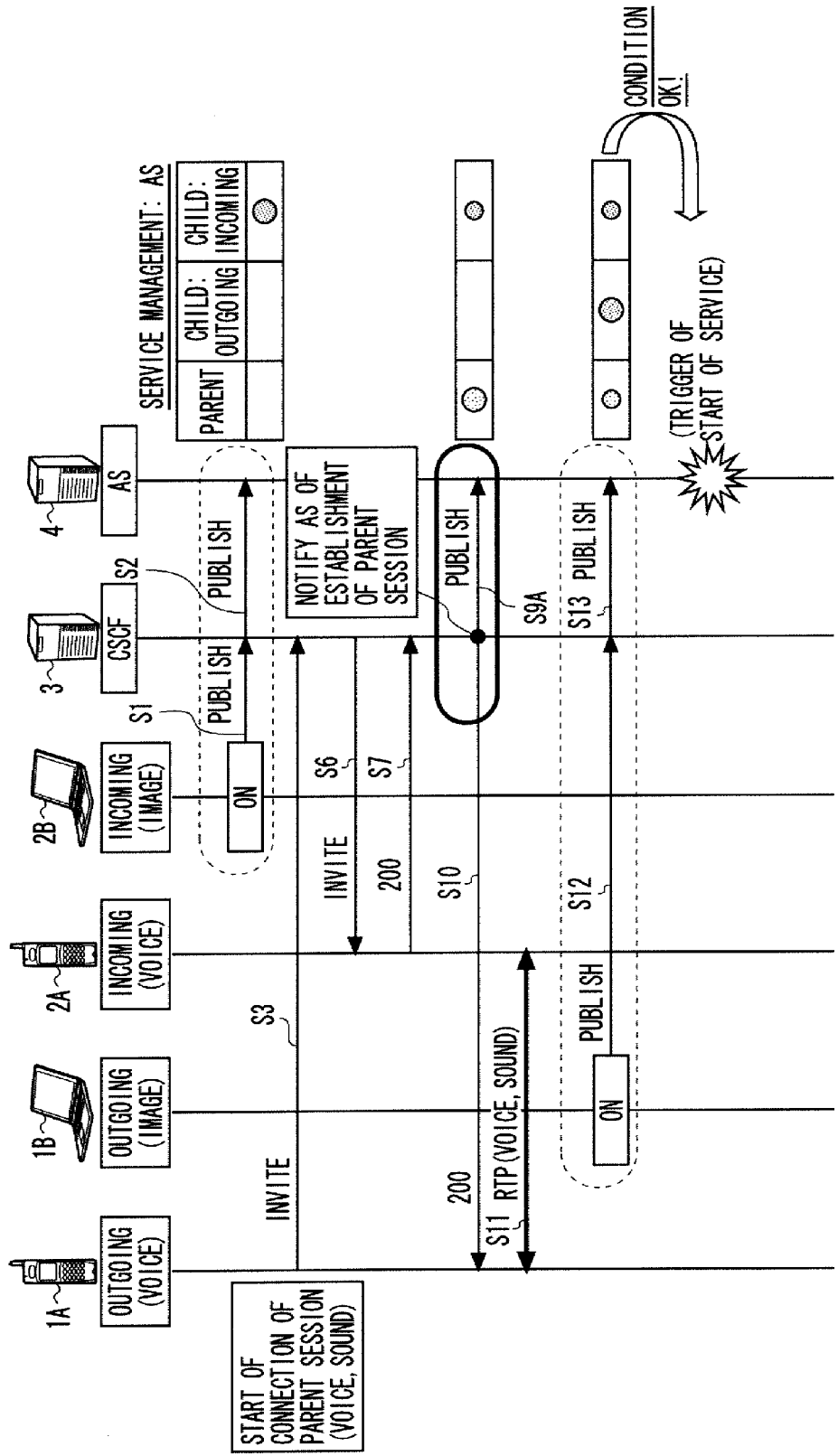
FIG. 9 is a sequence diagram of the communication system according to a second embodiment.

With respect to all of the AS providing service subscription calls, when the session is established (whereas when disconnected), the CSCF notifies the AS of the session by use of "PUBLISH" etc (see FIG. 9). In the method, the AS gets involved in all of presence statuses of a parent session and a child session. It is therefore determined whether or not the notified information is coincident with a service startup condition, or alternatively it is determined by conducting a comprehensive analysis whether the startup of the service is required or not.

Herein, the parent session connotes one communication set in a connecting status in the communication system. On the other hand, the child session connotes a second session associated with this one communication. Further, the presence of the child session represents a status of the child session.

While on the other hand, if an AS providing service subscriber is defined as an outgoing side or an incoming side, the CSCF gives the notification to the AS in a way that uses "PUBLISH" etc, which is triggered by establishing or disconnecting the session.

In this type of communication system, the CSCF implements the session control between users in a communication network defined by the IMS. Then, a scheme to be taken is that the CSCF notifies the AS of a main status change (completion of the connection, the disconnection, etc) of the session of the users who have subscribed the AS service to thereby receive the service, while the AS determines the startup of the service from the thus-notified session status and conditions. This scheme enables the communication system to reduce a processing load on the AS. From this reduction, an effect in obviating a delay and hindrance of the operation can be expected.

(3) Notifying Method when Determining Service Startup (Startup of Service: CSCF)

In this method, till reaching the startup condition with respect to the AS providing service also, the CSCF performs the call control, but the AS does not get involved in this control. The CSCF, when recognizing the startup of the AS providing service, gives the notification to the AS (see FIG. 12).

In this method, the AS, when the providing service reaches the startup condition, receives the notification saying this purport from the CSCF, and starts up the service as triggered by this notification. Even if the parent session has actually been established before this startup, it appears to the AS that the parent session is not established till reaching the service startup condition.

On the other hand, the CSCF manages the parent session and the child presence, and determines the startup of the service.

In this type of communication system, the CSCF implements the session control between the users in the communication network defined by the IMS. Further, a scheme to be taken is that the CSCF determines whether or not the AS may start up the service and gives a service startup instruction to the AS when to start up the service. This scheme enables the communication system, to a much greater degree than by the scheme (2) described above, to reduce both of the processing load on the AS and the traffic based on the notification from the CSCF to the AS.

First Embodiment

FIG. 3 illustrates a sequence diagram of the communication system according to a first embodiment. The communication system includes mobile terminals 1A, 2A (corresponding to first terminals) which transmit and receive sounds (voices) to and from each other, image terminals 1B, 2B (corresponding to second terminals) which transmit and receive images (pictures) to and from each other, a CSCF 3 which manages a start and an end of the voice communications between the mobile terminals 1A, 2A, and an AS 4 which provides the communication service containing the image between the image terminals 1B, 2B.

Herein, the mobile terminals 1A, 2A access the Internet via, e.g., a mobile telephone network, a wireless LAN (Local Area Network), etc and perform the communications with a variety of servers, e.g., the CSCF 3 on the Internet. Each of the mobile terminals 1A, 2A includes a CPU (Central Processing Unit), a voice (sound) input device for example a microphone, a voice (sound) output device for example a speaker, a memory, a display unit (a liquid crystal display, an electroluminescence panel, etc), an operation unit (keys, a pointing device, etc), a wireless communication interface, a wired communication interface, and so on. Each of these mobile terminals 1A, 2A is exemplified by a mobile phone, a PDA (Personal Digital Assistant or Personal Data Assistance), a PHS (Personal Handyphone System), etc, and a description thereof is omitted because of its configuration being well known. Note that the voice (sound) input device, the voice (sound) output device and a normal type of personal computer having a function of accessing the Internet may be used as substitutes for the mobile terminals 1A, 2A. Namely, the mobile terminals 1A, 2A are not necessarily indispensable for architecture of the communication system.

Each of the image terminals 1B, 2B includes the CPU, the memory, the display unit (the liquid crystal display, the electroluminescence panel, etc), the operation unit (the keys, the pointing device, etc), the wireless communication interface, the wired communication interface, and so forth. Each of the image terminals 1B, 2B is exemplified by the personal computer, a digital TV, etc.

The CSCF 3 is a server which is connected to the Internet and thus provides a SIP (Session Initiation Protocol) service. The CSCF 3 includes, e.g., the CPU, the memory, the display unit (the liquid crystal display, the electroluminescence panel, etc), the operation unit (the keys, the pointing device, etc), the wireless communication interface, the wired communication interface, etc.

In the first embodiment, the CSCF 3 functions, with respect to the AS service subscription call, as the relay device in place of providing the original SIP server. To be specific, the CSCF 3 relays, to the AS 4, a call having a subscription of the AS service (which is referred to as the AS service subscription call) on the outgoing side or the incoming side of a request (also termed a method) or a response (also termed a response code) among these requests and responses given from the mobile terminals 1A, 2A, etc. Further, the CSCF 3 relays, to the mobile terminals 1A, 2A, the request or the response addressed to the mobile terminals 1A, 2A from the AS 4.

The AS 4 is a server connected to the Internet and providing an IMS-based application service. The AS 4 includes, e.g., the CPU, the memory, the display unit (the liquid crystal display, the electroluminescence panel, etc), the operation unit (the keys, the pointing device, etc), the wireless communication interface, the wired communication interface, etc.

In the first embodiment, the AS 4 functions as the SIP server in place of the CSCF 3 with respect to the AS service subscription call. Accordingly, the AS 4 receives the requests from the mobile terminals 1A, 2A via the CSCF 3, and executes a process corresponding to each of the received requests. For instance, the AS 4, in response to a session establishing request (INVITE), transfers the request to a called party and sends the response therefrom to a requester. Further, the AS 4, upon receiving a request for status notification, manages the status of each terminal, corresponding to the notification.

Figure 4:
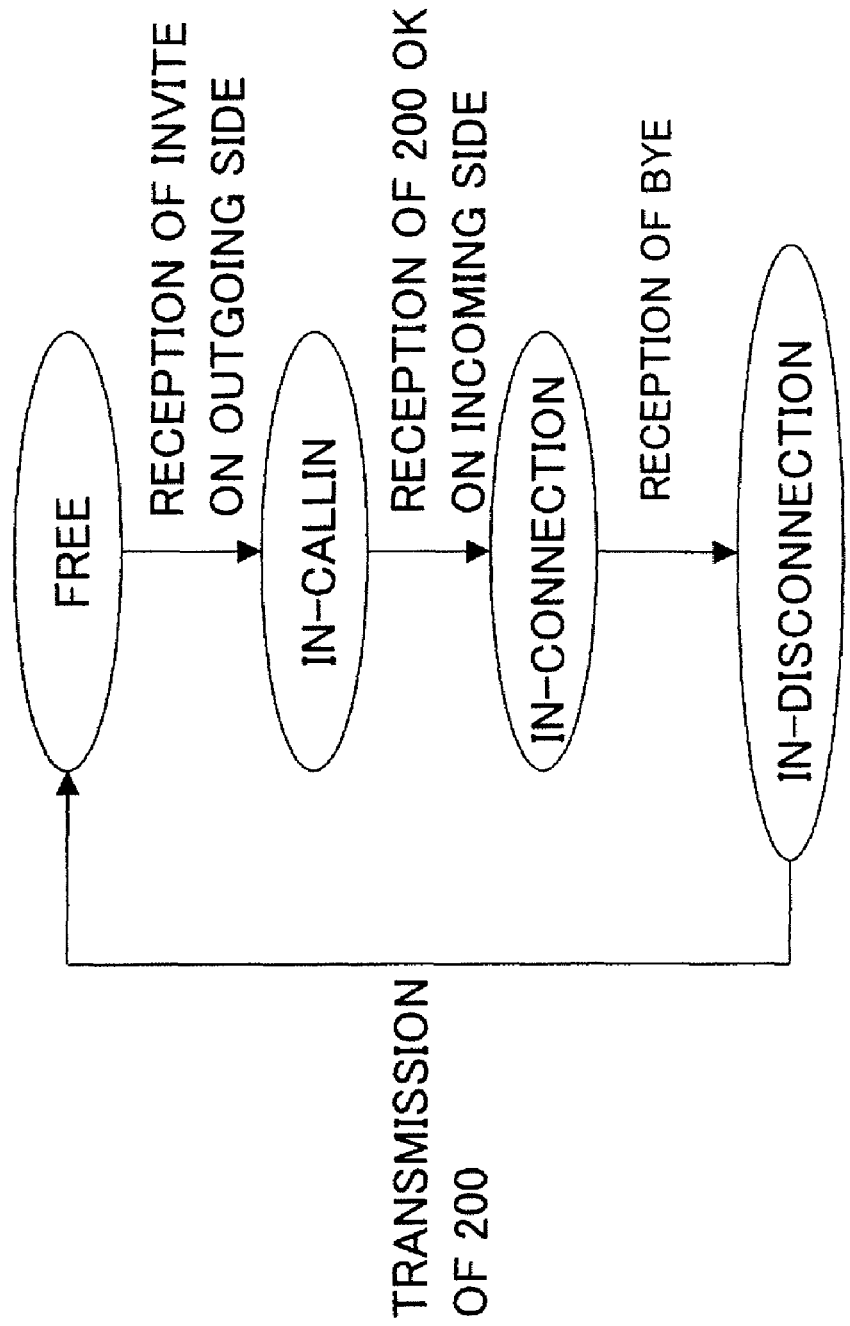
FIG. 4 is a diagram illustrating a transition of a status of the communication system according to a first embodiment.

FIG. 4 illustrates one example of a relationship between the requests/responses received from the terminals such as the mobile terminals 1A, 2A and the session statuses to which the terminals are related. In FIG. 4, when receiving INVITE from the terminal on the outgoing side, it is understood that a status between the outgoing side and the incoming side becomes an in-calling status. Further, when the SIP server receives a 200 (200 OK) response from the terminal on the incoming side, a status between the outgoing side and the incoming side becomes an in-connecting status, and it is recognized that the session is established. Moreover, when the SIP server receives a BYE request from any one of the terminals on the outgoing side or the incoming side, the session status gets into an in-disconnecting status. Then, when receiving the 200 OK response from the BYE sender terminal, each terminal becomes a free status.

In the first embodiment, the AS 4 functions as the SIP server for the service subscription call and manages the statuses in FIG. 4 for the respective terminals (the mobile terminals 1A, 2A, etc).

If the users of the mobile terminals 1A, 2A have subscribed for receiving the AS-based service, the mobile terminals 1A, 2A initiate, in the same way as by the prior art, the session for a voice conversation via the CSCF 3 functioning as the relay device and the AS 4 functioning as the SIP server, thus providing a telephone function. It is noted that if the users of the mobile terminals 1A, 2A have not subscribed for receiving the AS-based service, in the same way as by the prior art, the CSCF 3 may provide the function of the SIP server to the mobile terminals 1A, 2A.

Thus, in the first embodiment, during the continuation of the session for the voice conversation between the mobile terminals 1A, 2A, it follows that the CSCF 3 provides the session information to the AS 4. Moreover, the image terminals 1B, 2B, when reaching a status capable of transmitting and receiving the image information, notify via the CSCF 3 the AS 4 of having reached this status.

The AS 4 recognizes from the subscription information that the mobile terminal 1A and the image terminal 1B are the terminals employed in the service for a specified user U1. Further, the AS 4 recognizes from the subscription information that the mobile terminal 2A and the image terminal 2B are the terminals used in the service for a specified user U2. Then, the AS 4, when the voice session is initiated between the mobile terminals 1A and 2A and when recognizing that both of the image terminals 1B, 2B reach the status capable of transmitting and receiving the image information, initiates a image session between the image terminals 1B and 2B as the session related to the voice session between the mobile terminals 1A and 2A.

As a result, the image is transmitted and received between the image terminals 1B and 2B. For example, if the user U1 utilizing the mobile terminal 1A is in the middle of telephoning the user U2 using the mobile terminal 2A, the initiation of the session of the telephone is a trigger which enables the image information to be transmitted and received between the image terminal 1B held by the user U1 and the image terminal 2B held by the user U2. Namely, the user U1 and the user U2 initiate the voice session by operating the mobile terminals 1A, 2A, which is accompanied by the connection of the image session, and the service is thereby started.

In this case, the voice session initiated at first by the operations of the users U1, U2 is defined as a parent session. Further, a child session is a session between the image terminals 1B and 2B, of which the initiation is triggered by the initiation of the parent session under a condition that the session between the image terminals 1B and 2B comes to the ready for its initiation.

FIG. 5 illustrates an example of a structure of a service subscription information table. The service subscription information table has a definition of information for identifying the user who makes the subscription to receive the service provided by the communication system and a definition of information for identifying the terminal used when the user receives the service.

In this example, it is recorded in a service SV1 (e.g., a voice communication service) that the user U1 uses the mobile terminal 1A, while the user U2 employs the mobile terminal 2A. Herein, the "user U1, the user U2, etc" are pieces of identifying information for identifying the users in the communication system. Further, the "mobile terminals 1A, 2A, etc" are specified by SIP URIs (Uniform Resource Identifiers).

Moreover, it is recorded in a service SV2 (e.g., an image communication service) that the user U1 uses the image terminal 1B, while the user U2 employs the image terminal 2B. Accordingly, the user U1 is provided with the service SV1 through the mobile terminal 1A and provided with the service SV2 through the image terminal 1B. Further, the mobile terminal 1A is associated with the image terminal 1B by the same user. The same relationship is applied to between the user U2, the mobile terminal 2A and the image terminal 2B. In the first embodiment, the service subscription information table may be stored in the memory of the AS 4.

FIG. 6 illustrates an example of a structure of an AS service subscribed-or-unsubscribed status determining table. The AS service subscribed-or-unsubscribed status determining table is a table to which the CSCF 3 refers when receiving the request in the voice session that may become the parent session and when determining whether this request is the AS service subscription call or not.

As in FIG. 6, each row in the AS service subscribed-or-unsubscribed status determining table contains fields such as "user's identifying information", "identifying information of terminal used in voice session" and "AS service subscribed-or-unsubscribed status".

The "user's identifying information" is the identifying information of the user who subscribes the voice session and is, e.g., a subscriber number of the telephone service (VoIP). The "identifying information of terminal used in voice session" is, e.g., a SIP-URI of the terminal concerned. The CSCF 3, when storing the service subscription information in the service subscription information table, checks the AS service subscribed-or-unsubscribed status determining table. Then, if "unsubscribed" is registered in the AS service subscribed-or-unsubscribed status with respect to the SIP-URI of the terminal set in the service subscription information table, the CSCF 3 changes the AS service subscribed-or-unsubscribed status to "subscribed". Thus, it follows that "subscribed" is set in the AS service subscribed-or-unsubscribed status determining table with respect to the terminal with one or more AS service subscriptions being settled. The AS service subscribed-or-unsubscribed status determining table and the service subscription information table correspond to a terminal associated information storage unit stored with the identifying information of each of a plurality of first terminals and identifying information of each of second terminals in the way of being associated with each other.

The CSCF 3 determines by referring to the AS service subscribed-or-unsubscribed status determining table whether the sender of the request in the voice session is the AS service subscriber or not, thus identifying the AS service subscription call. It is noted, the determination as to whether or not the message is the AS service subscription call may not utilize the identifying information of the user. Namely, if the AS service subscribed-or-unsubscribed status determining table contains the identifying information (SIP-URI) of the terminal, it may be determined based on the SIP-URI on the outgoing side of the received request whether the message is the AS service subscription call or not. In the first embodiment, the AS service subscribed-or-unsubscribed status determining table may be stored in the memory of the CSCF 3.

A processing procedure of the communication system will hereinafter be described with reference to FIG. 3. At the first onset, an assumption herein is that in any one of the image terminals 1B, 2B, which is herein the image terminal 2B, a function utilized for the image communication service is switched ON. Herein, the function utilized for the image communication service connotes a startup etc of an image display program. Then, a communication program of the image terminal 2B notifies the CSCF 3 that the function utilized for the image communication service is switched ON (an arrowhead S1). This notification is conducted by use of, e.g., the SIP-based request "PUBLISH". The PUBLISH is used for notifying of the statuses of the mobile terminals 1A, 2A and the image terminals 1B, 2B, which perform the SIP-based communications. The PUBLISH contains notification saying that the function is switched ON and the SIP-URI of the image terminal 2B with its function being switched ON. The CSCF 3 receiving this notification corresponds to a second terminal status receiving unit. The CSCF 3 functions as the relay device and further notifies the AS 4 of the received notification (an arrowhead S2). The CSCF 3 executing this notification corresponds to a second terminal status notifying unit.

As a result, the AS 4 recognizes that the function used for the image communication service is switched ON in the image terminal 2B, and records the "function-ON" together with the SIP-URI of the image terminal 2B in a service management table. An example in FIG. 3 is that "receivable" is recorded with respect to one terminal related to the child session.

Next, for example, the mobile terminal 1A detects an operation of the user U1 and requests the CSCF 3 to initiate the voice-based parent session connected to the mobile terminal 2A (an arrowhead S3). At this time, the mobile terminal 1A transmits a SIP-based request "INVITE" to the CSCF 3. Hereat, the mobile terminal 2A is designated as a called party of the voice session.

As described above, in the first embodiment, the CSCF 3 functions as the relay device, and, with respect to the voice session, the AS 4 intervenes in the session maintained by the connection between the mobile terminals 1A, 2A of the users who make the subscription to receive the AS service. For example, the CSCF 3 determines, when receiving the request "INVITE", whether the outgoing side has made the subscription to receive the AS service and, if the AS service has been subscribed, transfers the INVITE temporarily to the AS 4 (an arrowhead S4). Then, the AS 4 transmits the request "INVITE" to the mobile terminal 2A on the incoming side via the CSCF 3 (arrowheads S5, S6).

The mobile terminal 2A sends a response (200, which is also termed OK) purporting a session initiation acknowledgement back to the CSCF 3 (an arrowhead S7). As for the response, the CSCF 3 similarly determines whether the sender of this response has made the subscription to receive the AS service or not, and, if the subscription of the AS service has been made, the CSCF 3 transfers the response temporarily to the AS 4 (an arrowhead S8). This response code 200 is transmitted from the AS 4 via the CSCF 3 to the mobile terminal 1A on the outgoing side which has initiated the voice session (arrowheads S9, S10). This triggers the initiation of voice session between the mobile terminals 1A and 2A (an arrowhead S11).

At this time, the AS 4 records an event that the voice session defined as the parent session is initiated between the mobile terminals 1A and 2A, in the service management table.

Herein, it is further assumed that a function utilized for the image communication service is switched ON in the image terminal 1B. Then, the communication program of the image terminal 1B notifies the CSCF 3 that the function utilized for the image communication service is switched ON (an arrowhead S12). This notification is carried out by use of, e.g., the SIP-based request "PUBLISH". The CSCF 3 further notifies the AS 4 of the received notification (an arrowhead S13).

Then, the AS 4 recognizes that the function utilized for the image communication service is switched ON in the image terminal 1B and records, in the service management table, this purport with respect to the SIP-URI reaching the function-ON status. As a result, the AS 4 recognizes that the function utilized for the image communication service is switched ON in both of the image terminals 1B, 2B which intervene in the child session, and further recognizes that the parent session is initiated.

As a result, the AS 4 starts connecting the image session defined as the child session associated with the parent session. To be specific, the AS 4 transmits the INVITE to the image terminal 1B via the CSCF 3 (arrowheads S14, S15). At this time, SDP information (SIP-URI) of the image terminal 2B is stored in the service management table, and hence the INVITE contains designation of the SIP-URI of the image terminal 2B as the SDP information on the outgoing side. In response to this, a message "200 OK" purporting the acknowledgement is sent back from the image terminal 1B (arrowheads S16, S17).

Moreover, the INVITE is transmitted to the image terminal 2B via the CSCF 3 (arrowheads S18, S19). At this time, the SDP information (SIP-URI) of the image terminal 1B is stored in the service management table, and therefore the INVITE contains the designation of the SIP-URI of the image terminal 1B as the SDP information on the outgoing side in the image session (child session). In response to this, the message "200 OK" purporting the acknowledgement is sent back from the image terminal 2B (arrowheads S20, S21). Through the procedure described above, the RTP session based on the image is initiated between the image terminals 1B and 2B (an arrowhead S22).

Figure 7:
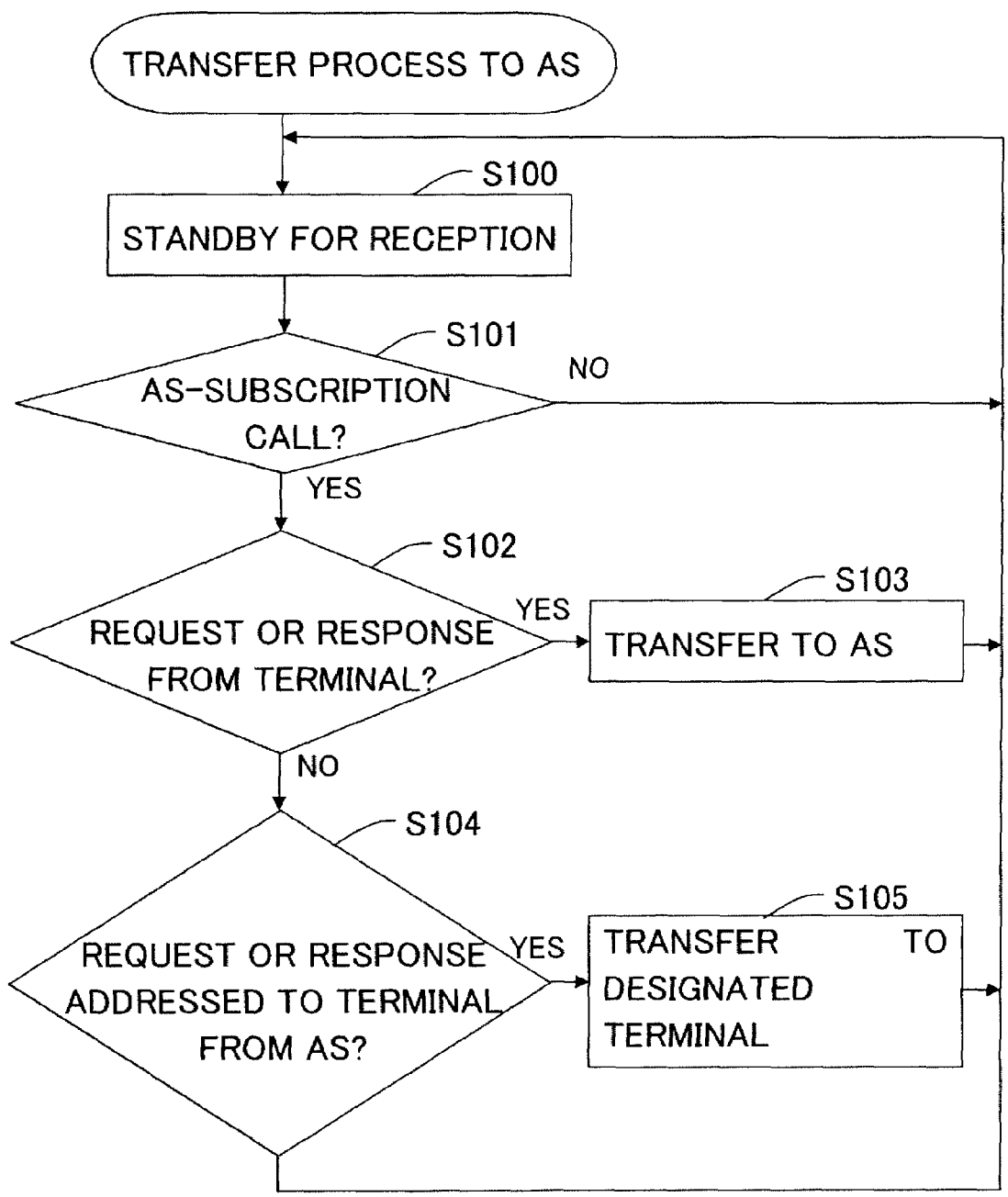
FIG. 7 is a flowchart illustrating a relay process executed by the CSCF.

FIG. 7 is a flowchart exemplifying a relay process executed by the CSCF 3. The information transferred and received between the terminals will hereinafter be called a message. The message contains the request and the response transmitted and received according to the SIP. Further, the image terminals 1B, 2B or the mobile terminals 1A, 2A are simply referred to as the terminals.

In this process, the CSCF 3 is normally in a standby status for the reception (S100). Then, the CSCF 3, when receiving the message from the terminal (the mobile terminals 1A, 2A, etc) determines whether this message is the AS subscription call or not (S101). The determination of whether the message is the AS subscription call or not involves reading, from the message, the SIP-URI of the terminal on the outgoing side of the message or the SIP-URI of the terminal on the incoming side of the message, and searching through the AS service subscribed-or-unsubscribed status determining table on the memory. Then, if the SIP-URI on the outgoing side or the incoming side is given a status "subscribed" in the AS service subscription status in the AS service subscribed-or-unsubscribed status determining table, the message is determined to be the AS subscription call. If the SIP-URIs on both of the outgoing side and the incoming side are given the status "subscribed" in the AS service subscription status, however, the message may be determined to be the AS subscription call.

Then, if the message is not the AS subscription call, the CSCF 3 loops the control back to S100. Whereas if the message is the AS subscription call, the CSCF 3 determines next whether the message is the request or the response from the terminal (S102). If the message is the request or the response from the terminal, the CSCF 3 transfers the message to the AS 4 (S103). Thereafter, the CSCF 3 loops the control back to S100.

Further, the CSCF 3, if the received message is neither the request nor the response from the terminal, determines whether this message is the request or the response addressed to the terminal from the AS 4 (S104). Then, if the message is the request or the response addressed to the terminal from the AS 4, the CSCF 3 transfers this message to the destination terminal (S105). Thereafter, the CSCF 3 loops the control back to S100. Moreover, whereas if the message is neither the request nor the response addressed to the terminal from the AS 4 (in the case of No in S104), the CSCF 3 directly loops the control back to S100. It is noted, the CSCF 3 may execute other kind of processing before looping the control back to S100 in the case of No in S104.

Figure 8:
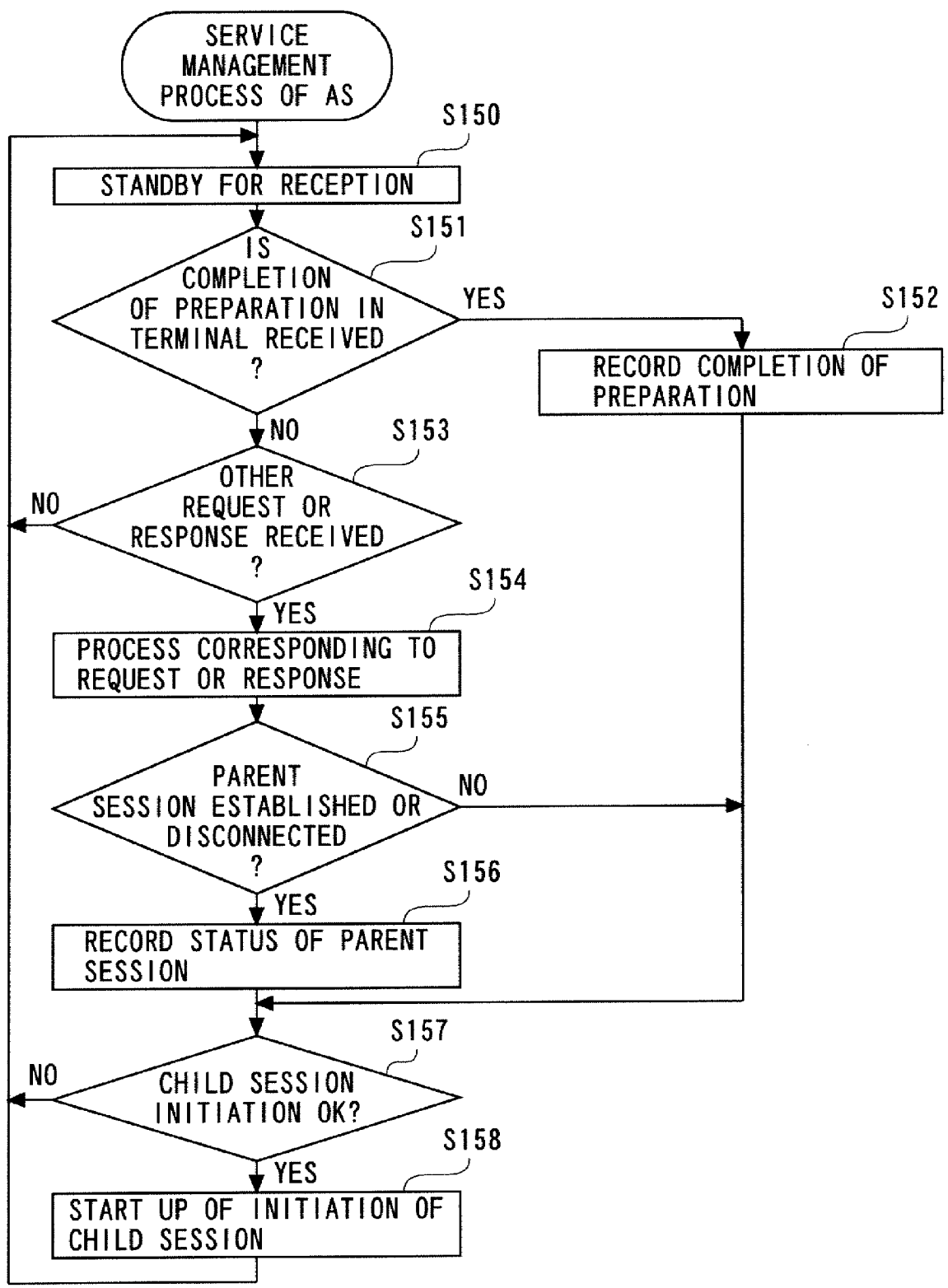

FIG. 8 is a flowchart illustrating a service management process in AS 4. In this process, the AS 4 is normally in the standby status for receiving the messages from the mobile terminals 1A, 2A etc, which are transmitted via the image terminals 1B, 2B or the CSCF 3 (S150).

The AS 4, upon receiving the message, determines whether or not the received message is the request (PUBLISH) conveying completion of preparation of the terminal (S151). If the received message is the request conveying the completion of preparation of the terminal, the AS 4 records the completion of preparation of the terminal in the service management table (S152). Thereafter, the AS 4 advances the control to S157.

Whereas if the received message is not the request conveying the completion of preparation of the terminal, the AS 4 determines whether the message is another SIP-based request or response (S153). If the received message is another SIP-based request or response, the AS 4 executes the process corresponding to the request or the response according to the SIP procedure (S154). For example, the AS 4, when receiving the INVITE, transfers this request to the called party. Further, the AS 4, when receiving the 200 OK, forwards this response to the response recipient.

Next, the AS 4 determines whether or not the status of the parent session is changed, e.g., the parent session is newly established or whether or not the existing parent session is disconnected (S155). Then, the AS 4, if the status of the parent session is changed, records the status of the parent session in the service management table (S156).

Subsequently, the AS 4 determines whether a condition for initiating the child session is settled or not (S157). If the condition for initiating the child session is settled, the AS 4 executes a child session initiation procedure (S158). Specifically, the AS 4 transmits the INVITE request to between the image terminals 1B and 2B each intervening in the child session. Namely, the AS 4 transmits the INVITE to the image terminal 1B, in which the image terminal 2B is set on the outgoing side. Further, the AS 4 transmits the INVITE to the image terminal 2B, in which the image terminal 1B is set on the outgoing side. Then, the AS 4 receives the 200 OK responses from both of the image terminals 1B, 2B. Thereafter, the AS 4 loops the control back to S150.

As discussed above, according to the communication system in the first embodiment, as between the mobile terminals 1A, 2A, the AS 4 is notified of the status of the session originally managed by the CSCF 3 via the CSCF 3. As a result, the AS 4 can grasp the session status through the notification. Accordingly, for instance, it is feasible to establish based on the decision of the AS 4 the session (child session) between the terminals, e.g., the image terminals 1B and 2B, which are associated with the terminals establishing the SIP-based connection as between the mobile terminals 1A and 2A connected in the relevant session (parent session). Namely, the child session associated with the parent session can be easily established based on the decision of the AS 4 at a timing corresponding to conditions of the terminals intervening in the child session.

It should be noted that the terminals, e.g., the mobile terminals 1A, 2A connected in the parent session and the terminals, e.g., the image terminals 1B, 2B connected in the child session are set as the different terminals in the first embodiment. However, a scheme of establishing the child session defined as the second session between the terminals connected in the parent session can be executed in the same procedure. To be specific, when each of the mobile terminals 1A, 2A connected in the parent session completes the preparation for the connection in the child session, the mobile terminals 1A, 2A may notify the AS 4 of this purport. In this case, the mobile terminals 1A, 2A may transmit the request (PUBLISH) for informing of the status via the CSCF 3. The AS 4 may executes a process of establishing the child session when the conditions for establishing the child session between the mobile terminals 1A and 2A are fulfilled.

Moreover, the first embodiment has exemplified the mobile terminals 1A, 2A by way of an example of the terminals connected based on the SIP in the parent session. The terminals connected in the parent session are not, however, limited to the mobile terminals 1A, 2A but may be fixed type devices such as the normal personal computers.

Second Embodiment

The communication system according to a second embodiment will hereinafter be described with reference to the drawings in FIGS. 9 through 11. The first embodiment has discussed the communication system, in which the CSCF 3 functions as the relay device, and the AS 4 executes the SIP-related processes, thereby enabling the AS 4 to be notified of the status of the parent session.

In the method of the first embodiment, however, all of the requests and the responses transmitted to the CSCF 3 from the user terminals subscribing the AS service are forwarded to the AS 4, which causes the rise in traffic in some cases. Such being the case, the second embodiment will discuss the communication system capable of further restraining the traffic and efficiently notifying the AS 4 of the status of the parent session.

It is noted that the AS service subscribed-or-unsubscribed status determining table may be stored in the memory of the CSCF 3, while the service subscription information table may be stored in the memory of the AS 4 in the second embodiment also.

Namely, in the communication system according to the second embodiment, the CSCF 3, unlike the case of the first embodiment, does not forward to the AS 4 all of the requests and the responses from the terminals of the users who make the subscription to receive the AS service. In the second embodiment, the CSCF 3 manages the status of the session between the terminals performing the SIP-based communications and, when reaching the status where the session is established, notifies the AS 4 of this purport. Accordingly, the CSCF 3 processes the requests sent from the terminal on the transmitting side and the responses sent from the terminal on the receiving side till reaching the establishment of the SIP-based session, while the AS 4 is not notified of these messages. Other configurations and operations are the same as those in the case of the first embodiment. Such being the case, the same components as those in the case of the first embodiment are marked with the same reference numerals and symbols, and the descriptions thereof are omitted.

FIG. 9 illustrates a sequence diagram of the communication system according to the second embodiment. In the second embodiment also, similarly to the first embodiment, the AS 4 is notified of the status of each of the image terminals 1B, 2B, etc via the CSCF 3 in the form of the request (PUBLISH) for informing of the status (arrowheads S1, S2). With this notification, the AS 4 detects the completion of the preparation for receiving the communication service related to the image in the image terminal 2B, and records this purport in the service management table.

Moreover, the request (PUBLISH) sent from the mobile terminal 1A on the outgoing side triggers a start of the process of connecting the voice session (an arrowhead S3). This request is transferred to the recipient mobile terminal 2A from the CSCF 3 (an arrowhead S6). Then, the 200 OK response is sent back from the recipient mobile terminal 2A (an arrowhead S7), and, when this response is transferred to the mobile terminal 1A on the outgoing side (an arrowhead S10), the SIP-based session is established (an arrowhead S11). At this time, the CSCF 3 notifies the AS 4 of the establishment of the SIP-based session (parent session) (an arrowhead S9A, PUBLISH). The CSCF 3 detecting that the SIP-based session is established corresponds to a first communication status detecting unit. Further, the CSCF 3, which notifies the AS 4 of the establishment of the SIP-based session (parent session) corresponds to a first communication status notifying unit.

With this notification, the AS 4 detects the establishment of the parent session and records this purport in the service management table.

Then, for instance, upon the completion of the preparation for connecting the image session in the image terminal 1B, the AS 4 is notified of this status via the CSCF 3 (arrowheads S12, S13). With this notification, the AS 4 detects the completion of the preparation in the image terminal 1B and records this purport in the service management table.

As a result, the AS 4 recognizes from the service management table that the preparations in the image terminals 1B, 2B which may be connected in the child session are completed and that the parent session associated with the child session is established. Then, the AS 4 autonomously establishes the child session associated with the parent session between the image terminals 1B and 2B. The procedure thereof is the same as S14-S22 in FIG. 3.

Figure 10:
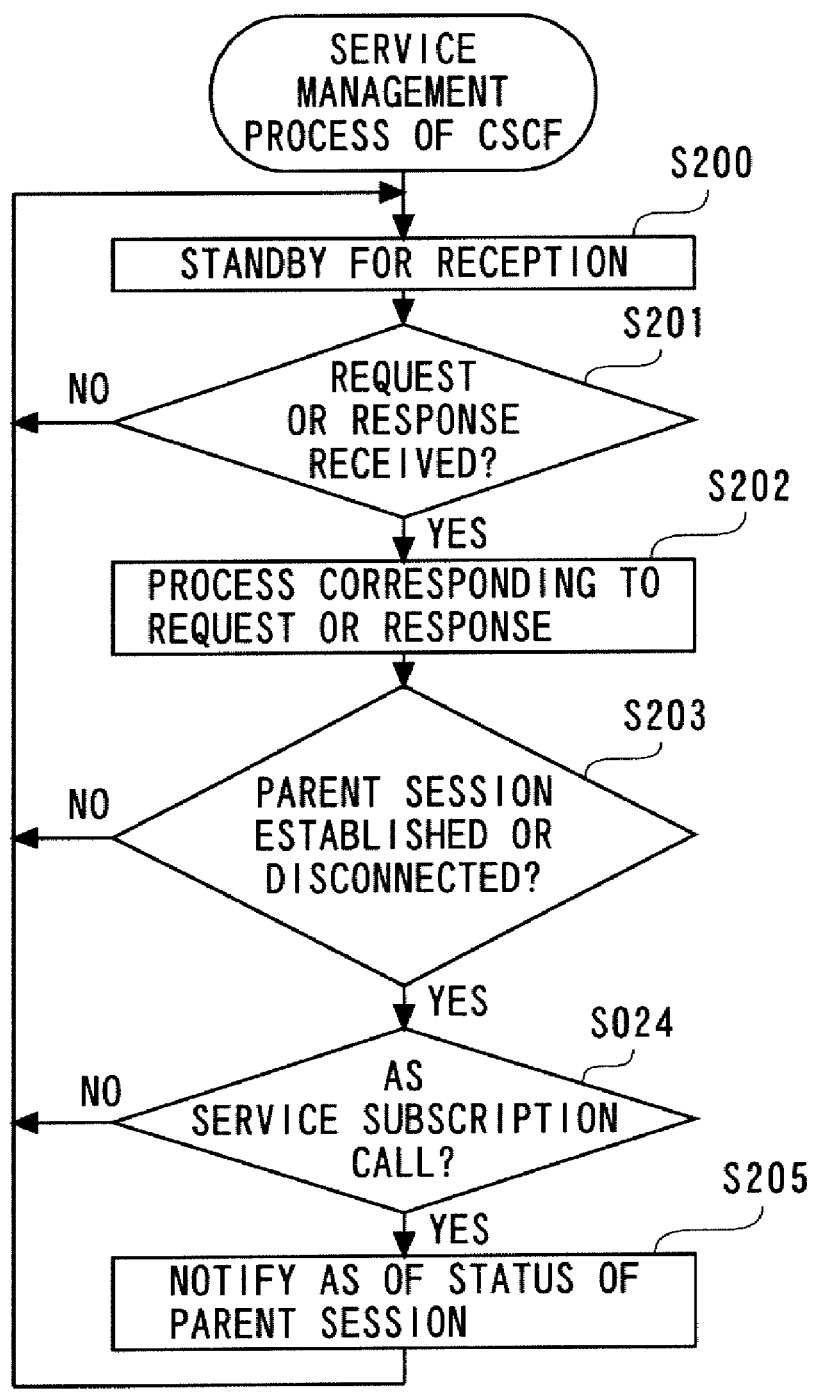
FIG. 10 is a flowchart for explaining a SIP-based service management process of the CSCF in the second embodiment.

FIG. 10 is a flowchart for explaining a SIP-based service management process of the CSCF 3 in the second embodiment. In this process, the CSCF 3 is normally in the standby status for receiving the message (S200). Then, the CSCF 3, upon receiving the message, determines whether the message is the request or the response (S201). If the received message is the request or the response, the CSCF 3 executes the process corresponding to the request or the response according to the SIP procedure (S202). It is noted, CSCF 3 may notify the AS 4 of the status of each of the image terminals 1B, 2B, etc in the form of the request (PUBLISH) for informing of the status.

Then, the CSCF 3 determines whether or not a change in status of the parent session occurs, e.g., determines whether or not the parent session is newly established or alternatively whether or not the existing parent session is disconnected (S203). Then, if the change in status of the parent session occurs, the CSCF 3 determines whether the request or the response is the AS service subscription call (S204). Subsequently, if the request or the response is the AS service subscription call, the CSCF 3 notifies the AS 4 of the status of the parent session (S205). Thereafter, the CSCF 3 loops the control back to S200.

Figure 11:
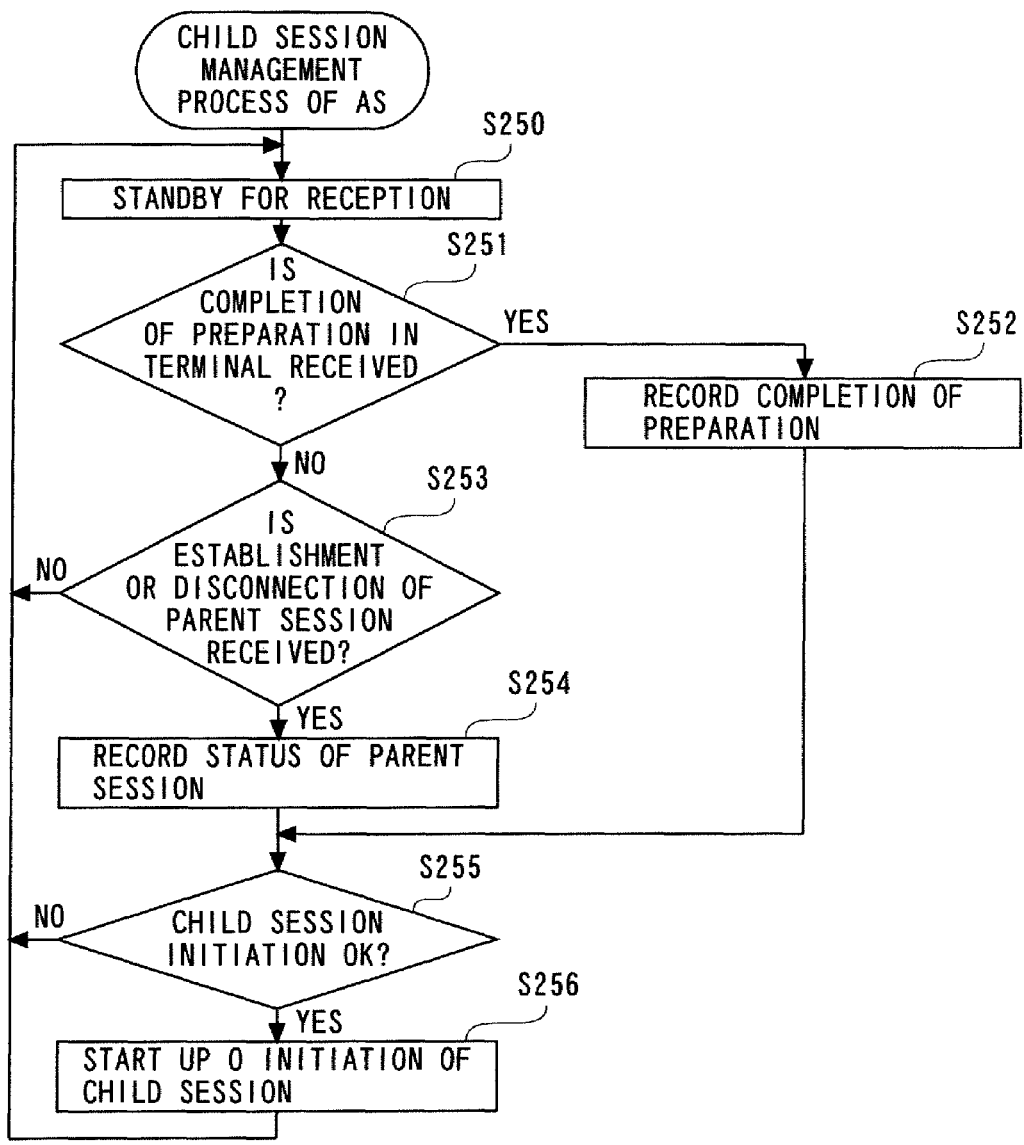
FIG. 11 is a flowchart illustrating the service management process executed by the AS in the second embodiment.

FIG. 11 is a flowchart illustrating the service management process executed by the AS 4 in the second embodiment. In this process, the AS 4 is normally in the standby status for the reception (S250). The AS 4, when receiving the message, determines whether or not the received message is the notification of the completion of the preparation of the terminal (S251). If the received message is the notification of the completion of the preparation of the terminal, the AS 4 records the completion of the preparation of the terminal (s252). Thereafter, the AS 4 advances the control to S255.

Further, if the received message is not the notification of the completion of the preparation of the terminal, the AS 4 determines whether or not the change in status of the parent session occurs, e.g., determines whether or not the parent session is newly established or alternatively whether or not the existing parent session is disconnected (S253). Then, if the change in status of the parent session occurs, the AS 4 records the status of the parent session in the service management table (S254).

Next, the AS 4 determines whether the conditions for initiating the child session are fulfilled or not (S255). If the conditions for initiating the child session are fulfilled, the AS 4 executes a procedure of initiating the child session (S256). Thereafter, the AS 4 loops the control back to S250.

As discussed above, according to the communication system in the second embodiment, the CSCF 3 executes the SIP management and, when detecting that the SIP-based session which becomes the parent session is established, notifies the AS 4 of this purport. Accordingly, as compared with the first embodiment, after reducing the traffic, the AS 4 getting involved in the service in the child session can be notified of the status of the parent session.

Third Embodiment

In the second embodiment, when the SIP-based parent session managed by the CSCF 3 is established, the CSCF 3 notifies the AS 4 of the status thereof. On the other hand, the AS 4 manages, in the service management table, the statuses of the terminals that is connected in the child session. Then, when the event that the preparation of the terminal is completed and the event that the parent session is established are fulfilled, the AS 4 executes the process of connecting the child session associated with the parent session. A third embodiment will discuss the communication system, in which the CSCF 3 executes managing the statuses of the terminals connected in the SIP-based parent session and child session, and, when the child session initiating conditions are satisfied, notifies the AS 4 of this purport. Other configurations and operations are the same as those in the cases of the first embodiment and the second embodiment. Such being the case, the same components as those in the first embodiment and the second embodiment are marked with the same reference numerals and symbols, and the descriptions thereof are omitted.

It is noted that both of the AS service subscribed-or-unsubscribed status determining table and the service subscription information table may be stored in the memory of the CSCF 3 in the third embodiment.

Figure 12:
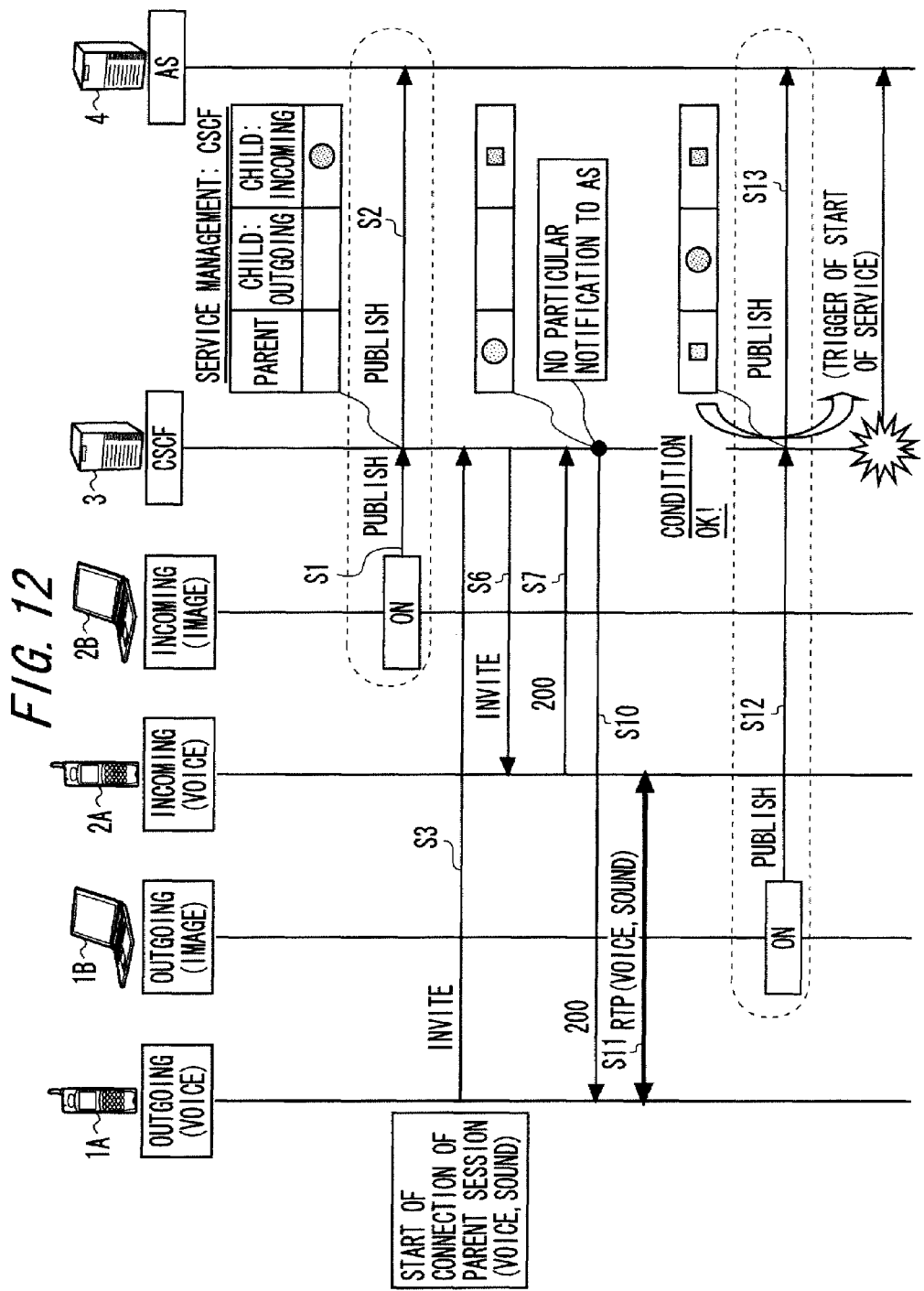
FIG. 12 is a sequence diagram of the communication system in a third embodiment.

FIG. 12 illustrates a sequence diagram of the communication system according to the third embodiment. In the third embodiment also, similarly to the first embodiment and the second embodiment, the notification of the statuses of the image terminals 1B, 2B, etc is given in the form of the request (PUBLISH) for notifying of the status (S1, S2). In the third embodiment, with this notification, the CSCF 3 detects the completion of the preparation for receiving the communication service related to the image in the image terminal 2B, and records this purport in the service management table. Accordingly, the notification (PUBLISH indicated by the arrowhead S2) to the AS 4 from the CSCF 3 is not necessarily required.

Further, when the voice session is established (arrowheads S3, S6, S7, S10, S11), the CSCF 3 detects the establishment of the parent session and records this purport in the service management table. In this case, unlike the second embodiment, the CSCF 3 does not notify the AS 4 of the establishment of the session.

Then, for example, the CSCF 3, when notified of the completion of the preparation for receiving the communication service related to the image in the image terminal 1B (an arrowhead S12), records this purport in the service management table. As a result, the CSCF 3 recognizes the completion of the preparation for starting up the image process in the image terminals 1B, 2B which should be connected in the child session and also recognizes the establishment of the parent session. Then, the CSCF 3 notifies the AS 4 that the child session initiating conditions are satisfied (S13). The CSCF 3, which notifies the AS 4 that the child session initiating conditions are satisfied, corresponds to an instructing unit giving an instruction to provide a service. The AS 4 establishes, based on the notification given from the CSCF 3, the child session associated with the parent session between the image terminals 1B and 2B. The procedure thereof is the same as S14-S22 in FIG. 3.

Figure 13:
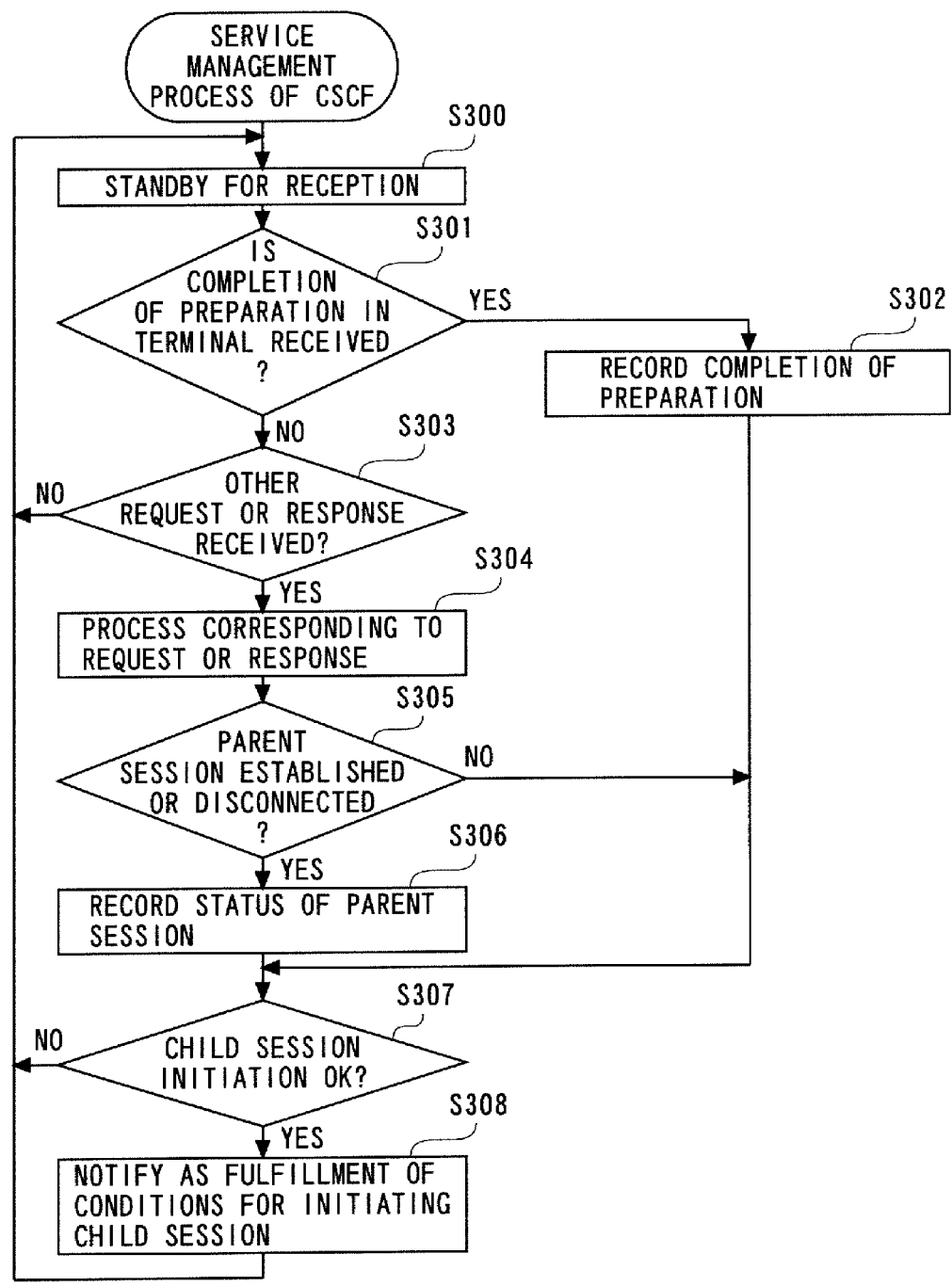
FIG. 13 is a flowchart for explaining a SIP-based service management process of the CSCF in the second embodiment.

FIG. 13 is a flowchart for explaining the SIP based service management process of the CSCF 3 in the third embodiment. In this process, the CSCF 3 is normally in the standby status for receiving the messages from the image terminals 1B, 2B or the mobile terminals 1A, 2A (S300).

The CSCF 3, when receiving the message, determines whether the received message is the notification of the completion of the preparation of the terminal or not (S301). If the received message is the notification of the completion of the preparation of the terminal, the CSCF 3 records the completion of the preparation of the terminal in the service management table (S302). Thereafter, the CSCF 3 advances the control to S307.

Whereas if the received message is not the notification of the completion of the preparation of the terminal, the CSCF 3 determines whether the message is the request or the response (S303). If the received message is another SIP-based request or response, the CSCF 3 executes the process corresponding to the request or the response according to the SIP procedure (S304).

Next, the CSCF 3 determines whether or not the change in status of the parent session occurs, e.g., determines whether or not the parent session is newly established or alternatively whether or not the existing parent session is disconnected (S305). Then, if the change in status of the parent session occurs, the CSCF 3 records the status of the parent session in the service management table (S306).

Next, the CSCF 3 determines whether the conditions for initiating the child session are fulfilled or not (S307). If the conditions for initiating the child session are fulfilled, the CSCF 3 notifies the AS 4 that the conditions for initiating the child session are fulfilled (S308). This notification may contain the pieces of identifying information (SIP URIs) of the terminals (e.g., the image terminals 1B, 2B) intervening in the child session. Thereafter, the CSCF 3 loops the control back to S300.

The AS 4, upon receiving the notification showing that the conditions for initiating the child session are fulfilled, establishes the session between the terminals, e.g., the image terminals 1B and 2B which is to be connected in this child session. The procedure is the same as S14-S22 illustrated in FIG. 3.

As discussed above, according to the communication system in the third embodiment, the CSCF 3 executes managing the parent session between the terminals performing the SIP-based communications and managing the statuses of the terminal which may be connected in the child session that may be established in association with the parent session. Then, if the conditions for initiating the child session associated with the parent session are fulfilled, the CSCF 3 notifies the AS 4 of this purport. Accordingly, the notification to the AS 4 from the CSCF 3 may not occur till the conditions for initiating the child session are fulfilled, and hence the traffic to the AS 4 to the CSCF 3 is reduced to a greater degree than in the case of the second embodiment.

Other Modified Examples

In the first through third embodiments, the AS 4 is notified of the status of the parent session via the CSCF 3. As a substitute for this scheme, the terminals connected in the parent session may notify the AS 4 of the status of the parent session.

Figure 14:
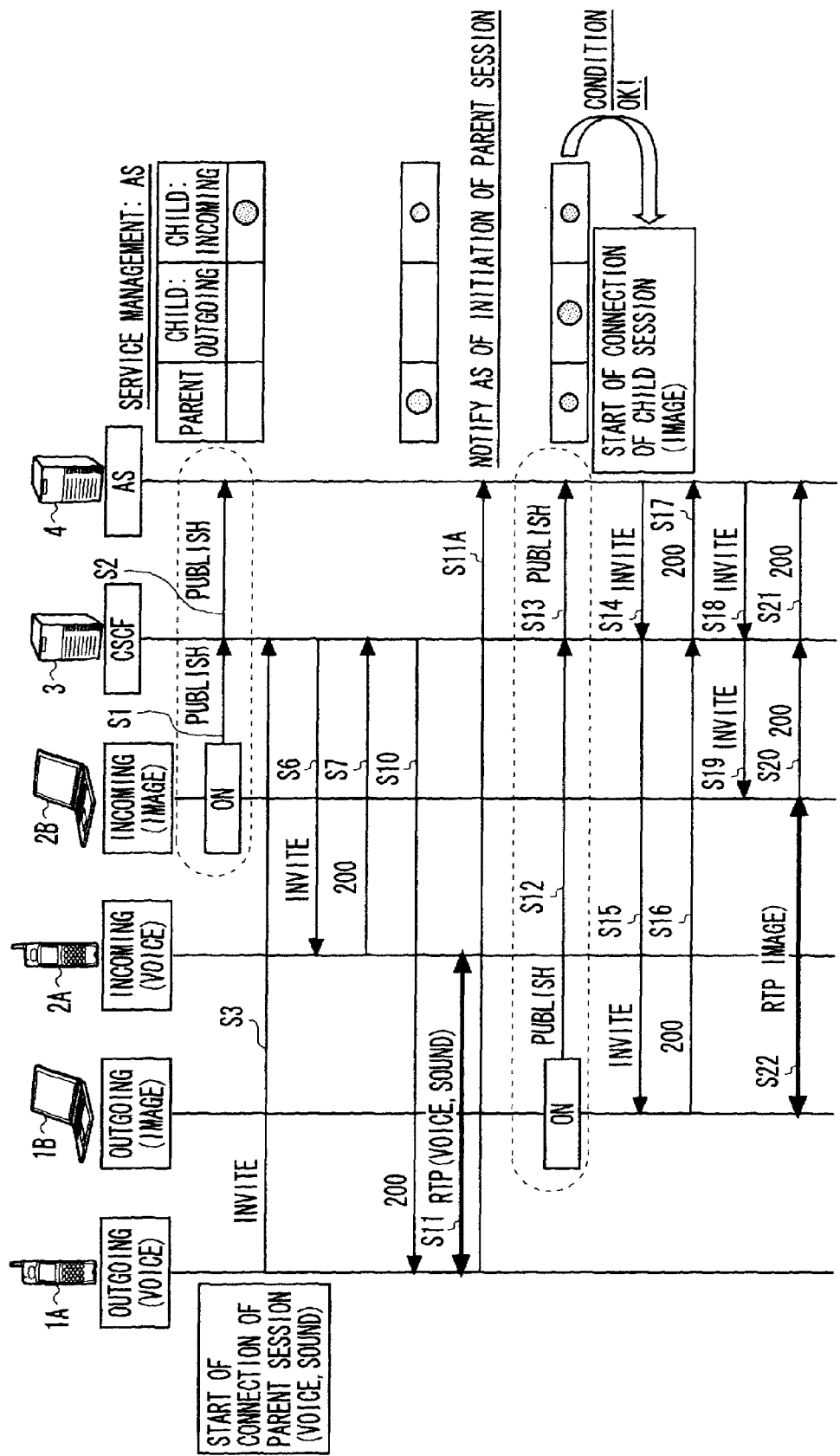
FIG. 14 is a sequence diagram of the communication system in which a terminal connected in a parent session notifies the AS of a status of the parent session.

FIG. 14 illustrates a sequence diagram of the communication system, in which the terminals connected in the parent session may notify the AS 4 of the status of the parent session. In this process, the notification (the arrowheads S1, S2 and the arrowheads S12, S13) of the status from the image terminals 1B, 2B is the same as in the first through third embodiments. Moreover, the procedure (the arrowheads S3-S11) for establishing the SIP-based session between the mobile terminals 1A, 2A is pursuant to the normal SIP procedure.

In the embodiment, when the SIP-based session is established (the arrowhead S11), one terminal connected in this session, which is, e.g., the mobile terminal 1A defined as the terminal on the outgoing side, notifies the AS 4 that the SIP-based session is established (an arrowhead S11A). This notification may be based on, e.g., HTTP (HyperText Transfer Protocol).

As a result, the AS 4 recognizes the establishment of the parent session and records this purport in the service management table. Then, the AS 4 determines that the conditions for initiating the child session are fulfilled, and starts up the procedure for establishing the child session (the arrowheads S14-S22). The AS 4 starting up the procedure for establishing the child session corresponds to a connecting unit.

As discussed above, the terminals themselves connected in the parent session directly notify the AS 4 of the status of the parent session without via the CSCF 3, thereby also enabling the AS 4 to recognize the status of the parent session and the service in the child session associated with the parent session to be started up.

Note that the mobile terminal 1A defined as the terminal on the outgoing side notifies the AS 4 that the SIP-based session is established in the process of S11A, however, an available scheme as a substitute for this is that the mobile terminal 2A defined as the terminal on the incoming side notifies the AS 4 that the SIP-based session is established.

As illustrated above, AS4 as the second server, providing the child session (corresponding to the second communications) as the associative added service with respect to the parent session (corresponding to the first communications) managed by CSCF3 as the first server, obtains the information on the parent session and thus can easily provide the service of the child session as the associative added service.

<<Readable-by-Computer Recording Medium>>

A program for making a computer, other machines and devices (which will hereinafter be referred to as the computer etc) realize any one of the functions can be recorded on a recording medium readable by the computer etc. Then, the computer etc is made to read and execute the program on this recording medium, whereby the function thereof can be provided.

Herein, the recording medium readable by the computer etc connotes a recording medium capable of storing information such as data and programs electrically, magnetically, optically, mechanically or by chemical action, which can be read from the computer etc. Among these recording mediums, for example, a flexible disc, a magneto-optic disc, a CD-ROM, a CD-R/W, a DVD, a BD (Blue-ray Disc), a DAT, an 8 mm tape, a memory card, etc are given as those removable from the computer.

Further, a hard disc, a ROM (Read-Only Memory), etc are given as the recording mediums fixed within the computer etc.

All example and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A communication method in a system comprising: a first server managing first communications between a plurality of first terminals; and a second server providing a service based on second communications between the plurality of first terminals or between a plurality of second terminals related respectively to the plurality of first terminals, the second communications associated with the first communications, the first server executing:
receiving notification of completion of a preparation for a connection from each of the plurality of second terminals to perform the second communications;
notifying the second server of the completion of the preparation for the connection of each of the plurality of second terminals;
detecting the connection based on the first communications between the plurality of first terminals; and
notifying the second server of the detected connection based on the first communications, the second server executing:
providing a service based on the second communications between the plurality of second terminals upon recognizing the completion of the preparation for the connection in each of the plurality of second terminals and the detected connection based on the first communications between the first terminals.

2. The communication method according to claim 1, wherein at least one of the first server and the second server has information for identifying the second terminal related to the first terminal.

3. The communication method according to claim 1, wherein the first terminal and the second terminal are the same terminals.

4. A communication method in a system comprising: a first server managing first communications between a plurality of first terminals; and a second server providing a service based on second communications between the plurality of first terminals or between a plurality of second terminals related respectively to the plurality of first terminals, the second communications associated with the first communications, the first server executing:
receiving notification of completion of a preparation for a connection from each of the plurality of second terminals to perform the second communications; and
notifying the second server of the completion of the preparation for the connection of each of the plurality of second terminals, at least one of the plurality of first terminals executing:
detecting the connection based on the first communications with another of the plurality of first terminals; and
notifying the second server of the detected connection based on the first communications, the second server executing:
providing a service based on the second communications between the plurality of second terminals upon recognizing the completion of the preparation for the connection in each of the plurality of second terminals related respectively to the one and the another of the plurality of first terminals and the detected connection based on the first communications between the one and the another of the plurality of first terminals.

5. A communication method in a system comprising: a first server managing first communications between a plurality of first terminals; and a second server providing a service based on second communications between the plurality of first terminals or between a plurality of second terminals related respectively to the plurality of first terminals, the second communications associated with the first communications, the first server executing:
receiving notification of completion of a preparation for a connection from each of the plurality of second terminals to perform the second communications;
detecting the connection based on the first communications between the plurality of first terminals; and
instructing the second server to provide a service based on the second communications between the plurality of second terminals upon recognizing the completion of the preparation for the connection in each of the plurality of second terminals and the detected connection based on the first communications between the first terminals, the second server executing:
providing the service based on the second communications between the plurality of second terminals upon receiving a service providing instruction sent from the first server.

6. A server to manage first communications between a plurality of first terminals and to link up with a communication server providing a service based on second communications associated with the first communications, the server comprising:
a terminal associated information storage unit stored with identifying information of each of the plurality of first terminals and identifying information of each of a plurality of second terminals in the way of being associated with each other;
a second terminal status receiving unit to receive notification of completion of a preparation for a connection from each of the plurality of second terminals to perform the second communications;
a second terminal status notifying unit to notify the communication server of the completion of the preparation for the connection of each of the plurality of second terminals;
a first terminal communication status detecting unit to detect the connection based on the first communications between the plurality of first terminals; and
a first communication status notifying unit to notify the communication server of the detected connection based on the first communications.

7. A server to manage first communications between a plurality of first terminals and to link up with a communication server to provide a service based on second communications associated with the first communications, the server comprising:
a terminal associated information storage unit stored with identifying information of each of the plurality of first terminals and identifying information of each of a plurality of second terminals in the way of being associated with each other;

a second terminal status receiving unit receiving notification of completion of a preparation for a connection from each of the plurality of second terminals to perform the second communications;

a first terminal communication status detecting unit to detect the connection based on the first communications between the plurality of first terminals; and an instructing unit to instruct the communication server to provide a service based on the second communications between the plurality of second terminals upon recognizing the completion of the preparation for the connection in each of the second terminals and the detected connection based on the first communications between the first terminals.

8. A server providing a service based on second communications associated with first communications between a plurality of first terminals, comprising:

a terminal associated information storage unit stored with identifying information of each of the plurality of first terminals and identifying information of each of a plurality of second terminals in the way of being associated with each other;

a second terminal status receiving unit to receive notification of a completion status of a preparation for a connection based on the second communications in the plurality of second terminals;

a first terminal communication status receiving unit to receive the notification of the connection based on the first communications between the plurality of first terminals; and a connecting unit to provide a service based on the second communications between the plurality of second terminals upon recognizing the completion of the preparation for the connection in each of the second terminals and the detected connection based on the first communications between the first terminals.

9. A storage medium storing executable instructions of a computer program that, when executed by a computer, causes the computer to manage first communications between a plurality of first terminals and to link up with a communication server to provide a service based on second communications associated with the first communications, the computer comprising a terminal associated information storage unit stored with identifying information of each of the plurality of first terminals and identifying information of each of a plurality of second terminals in the way of being associated with each other, the instructions causing the computer execute;

receiving notification of completion of a preparation for a connection from each of the plurality of second terminals to perform the second communications;

notifying the communication server of the completion of the preparation for the connection of each of the plurality of second terminals;

detecting the connection based on the first communications between the plurality of first terminals; and notifying the communication server of the detected connection based on the first communications.

10. A storage medium storing executable instructions of a computer program that, when executed by a computer, causes the computer to manage first communications between a plurality of first terminals and to link up with a communication server to provide a service based on second communications associated with the first communications, the computer comprising a terminal associated information storage unit stored with identifying information of each of the plurality of first terminals and identifying information of each of a plurality of second terminals in the way of being associated with each other, the instructions causing the computer to execute;

receiving notification of completion of a preparation for a connection from each of the plurality of second terminals to perform the second communications;

detecting the connection based on the first communications between the plurality of first terminals; and instructing the communication server to provide a service based on the second communications between the plurality of second terminals upon recognizing the completion of the preparation for the connection in each of the second terminals and the detected connection based on the first communications between the first terminals.

11. A storage medium storing executable instructions of a computer program that, when executed by a computer, causes the computer to provide a service based on second communications associated with the first communications between a plurality of first terminals, the computer comprising a terminal associated information storage unit stored with identifying information of each of the first terminals and identifying information of each of a plurality of second terminals in the way of being associated with each other, the program causing the computer to execute;

receiving notification of a completion status of a preparation for a connection based on the second communications in the plurality of second terminal;

receiving the notification of the connection based on the first communications between the plurality of first terminals; and providing a service based on the second communications between the plurality of second terminals upon recognizing the completion of the preparation for the connection in each of the second terminals and the detected connection based on the first communications between the first terminals.

\* \* \* \* \*